United States Patent [19]

Svab

[11] Patent Number: 4,502,352
[45] Date of Patent: Mar. 5, 1985

[54] INFINITELY VARIABLE TRANSMISSION FOR A VEHICLE

[75] Inventor: Eugen Svab, Cologne, Fed. Rep. of Germany

[73] Assignee: Ford Motor Company, Dearborn, Mich.

[21] Appl. No.: 450,171

[22] Filed: Dec. 16, 1982

[30] Foreign Application Priority Data

Jan. 28, 1982 [DE] Fed. Rep. of Germany ....... 3202692

[51] Int. Cl.$^3$ ...................... F16H 37/00; F16H 37/08; F16D 25/00
[52] U.S. Cl. ........................................ 74/689; 74/740; 74/694; 74/695; 74/701; 74/785; 74/788; 192/85 AA
[58] Field of Search ................. 74/689, 740, 694, 705, 74/695, 674, 785, 786, 788, 701, 681, 665 GE; 192/85 AA, 85 A, 113 B; 92/260

[56] References Cited

U.S. PATENT DOCUMENTS

| | | | |
|---|---|---|---|
| 4,294,137 | 10/1981 | Piret et al. | 74/665 GE X |
| 4,304,150 | 12/1981 | Lupo et al. | 74/677 |
| 4,317,389 | 3/1982 | Falzoni | 74/714 X |
| 4,329,888 | 5/1982 | Falzoni | 74/689 |
| 4,335,629 | 6/1982 | Falzoni | 74/689 |
| 4,353,270 | 10/1982 | Falzoni | 74/689 |
| 4,368,650 | 1/1983 | Numazawa et al. | 74/701 X |
| 4,392,394 | 7/1983 | Hofbauer et al. | 74/689 |
| 4,414,862 | 11/1983 | Svab | 74/785 X |
| 4,433,594 | 2/1984 | Smirl | 74/694 X |

FOREIGN PATENT DOCUMENTS

| | | | |
|---|---|---|---|
| 1630298 | 6/1971 | Fed. Rep. of Germany . | |
| 56-66544 | 6/1981 | Japan | 74/740 |
| 773952 | 5/1957 | United Kingdom | 74/788 |

*Primary Examiner*—Leslie A. Braun
*Assistant Examiner*—Arthur T. Quiray
*Attorney, Agent, or Firm*—Donald J. Harrington; Keith L. Zerschling

[57] ABSTRACT

A gear unit for vehicles comprising an input shaft 3 driven by the driving shaft 1 of a drive motor by means of a start-up clutch unit 2, an input shaft extending coaxially through a primary shaft 4 of a continuously variable gear unit 5, the traction member 6 driving a secondary shaft 7 arranged parallel to the primary shaft; an epicyclic gear unit 8, which drives the primary shaft 4 in different rotational directions by means of a forward and reverse clutch unit being disposed on the input shaft 3, the secondary shaft 7 driving by means of a reduction gear unit 10 an output shaft 11, which is in driving connection with a differential gear unit 12, the start-up clutch unit is a hydraulically controlled one-disk-wet clutch which has a housing 13, 14 and 15 and forms the flywheel for a driving internal-combustion engine and which receives a starter ring 23 and drives a hydraulic fluid pump 28 arranged on a partition wall 29 of the gear housing.

4 Claims, 2 Drawing Figures

INFINITELY VARIABLE TRANSMISSION FOR A VEHICLE

GENERAL DESCRIPTION OF THE INVENTION

The invention relates to a power transmission mechanism for a vehicle particularly for a motor vehicle.

Power transmission mechanisms of known design include a start-up clutch unit in the form of a hydraulic clutch or a hydrokinetic torque converter, a continuously variable belt drive unit and variously arranged epicyclic gear units that are shifted by appropriate forward and reverse gear clutch units. A gear unit of this type is described in German Patent Specification No. 16 30 298, published June 16, 1971.

Continuously variable gear units of this type save fuel to a greater degree than is expected by conventional automatic gears comprising sets of epicyclic gears which are shifted by a hydraulic servo arrangement.

The gear units for vehicles developed in this field until now have the disadvantage that the start-up clutch unit used is in the form of a hydraulic clutch or a hydrokinetic torque converter. These units contribute to a reduction in the over-all efficiency on account of the slippage that occurs in them.

According to the present invention, there is provided a gear unit for a vehicle comprising an input shaft adapted to be driven by the driving shaft of a drive motor by means of a hydraulically controlled one-disk-wet start-up clutch, the input shaft extending coaxially through a primary shaft of a continuously variable gear unit, the traction member of which drives a secondary shaft arranged parallel to the primary shaft and an epicyclic gear unit including a forward and reverse clutch disposed on the input shaft to drive the primary shaft in different rotational directions. A secondary shaft is drivably connected by means of a reduction gear unit to an output shaft which is in driving connection with a differential gear unit, wherein the housing of the start-up clutch receives an annular piston and simultaneously is adapted to form the flywheel for a driving internal-combustion engine. It also carries a starter gear and drives a hydraulic fluid pump.

As a result of the construction of the start-up clutch unit, it is possible to avoid hydraulic slippage losses and to permit a proper disposition of the oil pump, which makes available the pressure medium for controlling the clutch, the continuously variable gear unit actuated by hydraulic servos and the hydraulically actuated forward-and-reverse clutch unit.

The forward-and-reverse clutch may be a cone clutch for connecting or locking together the elements of the epicyclic gear, with the annular gear being locked on to the housing by a hydraulic annular piston in order to engage reverse gear. The planet wheel carrier may be connected to the annular wheel by a restoring spring in order to engage the forward gear. Thus no pressure medium is required for the forward-and-reverse clutch for driving in the forward gear, so that the supply to the oil pump may be reduced and thus its pumping action, which impairs the over-all efficiency of the transmission, may be reduced.

If the housing of the start-up clutch is formed by pressed sheet metal parts, the oil channels may be constructed integrally in the form of corrugations. Short fluid channels causing little loss are thus made available for the pressure medium required.

DESCRIPTION OF THE FIGURES OF THE DRAWINGS

The invention is described, by way of example, with reference to the accompanying drawing, in which.

PARTICULAR DESCRIPTION OF THE INVENTION

Figures 1, 2:
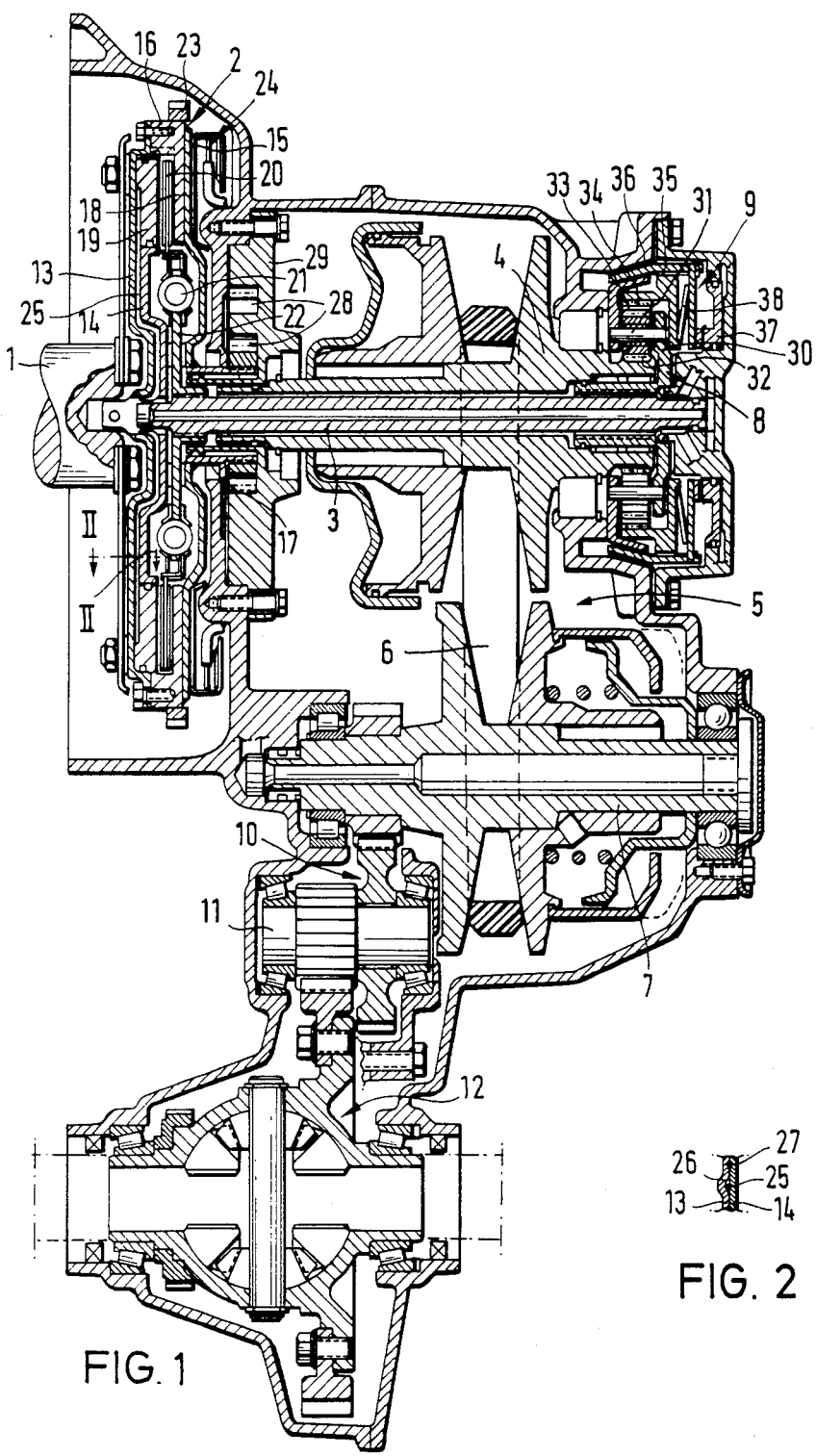
FIG. 1 is a vertical section through a gear unit according to the invention.
FIG. 2 is a section along the line 11—11 in FIG. 1.

A gear unit for a motor vehicle is illustrated in FIG. 1. It is provided with an input shaft 3 which is driven by the driving shaft 1 of a drive motor by means of a start-up clutch unit 2. The input shaft 3 extends coaxially through a primary shaft 4 of a continuously variable contact gear unit 5 whose traction member 6 drives a secondary shaft 7 arranged parallel to the primary shaft 4. An epicyclic gear unit 8 is disposed at the end of the input shaft 3 opposite the start-up clutch unit. The gear unit 8 can drive the primary shaft 4, which is controlled by a forward-and-reverse clutch unit 9, in different rotational directions. The secondary shaft 7 driven by means of the traction member 6 drives, by means of a reduction gear unit 10, an output shaft 11 which is in driving connection with a differential gear unit 12.

The start-up clutch unit 2 is a hydraulically controlled one-disk-wet clutch which has a clutch housing formed by three pressed sheet metal parts 13, 14 and 15, an outer covering 16, a driving collar 17, a pressure plate 18 secured to part 15 and an annular piston 19 arranged in an annular area between part or wall members 13 and 14 as well as a clutch-disc arrangement disposed in the clutch housing and consisting of a clutch disc 20, a damping device 21 and a collar 22.

The clutch housing forms the flywheel for a driving internal-combustion engine, and a ring gear 23 for engagement by a starter motor pinion is disposed directly on the outer covering 16 of the clutch housing. In addition, a so-called Pitot collector 24, which is required for the hydraulic control of the start-up clutch unit 2, may be disposed on part 15 of the clutch housing. The two cooperating parts 13 and 14 of the clutch housing are preferably constructed in such a way that they form compression-medium channels 25 required for the annular piston 19 in the form of corrugations 26, which are provided in part 13 and are closed by the other part 14. The two parts 13 and 14 of the clutch housing are advantageously connected together by spot welds 27, as seen in FIG. 2.

The driving collar 17 of the clutch housing drives the driven gearwheel of a toothed gearwheel oil pump 28 which is arranged in a partition wall 29 of the gear housing. The same components may be used for this oil pump 28 as are already used as a compression-medium pump in the case of conventional automatic transmission.

The collar 22 of the clutch-disc arrangement is non-rotatably connected to the input shaft 3, the other end of which is connected to the planet wheel carrier 30 of the epicyclic gear unit 8. The planet wheel carrier 30 has two sets of mutually engaging planet wheels, the inner set 31 of which engages with a sun wheel 32 formed on the primary shaft 4, while the outer set 33 engages with an annular gear 34 which may be locked to the gear housing.

Conical surfaces for the forward-and-reverse clutch unit 9 with its annular piston 37 and its restoring spring 38, are provided on a radially outward part of the planet wheel carrier 30, on a component 35 connected to the annular gear 34 and mounted for axial rotary displacement in the gear housing and on part of the housing 36.

The arrangement of these conical surfaces is such that in order to lock the annular gear 34 in the housing, as is required for engaging reverse gear, the annular piston 37 is hydraulically actuated, whereas in order to connect the planet wheel carrier 30 to the annular gear 34, as is required for engaging the forward gear, the pressure space behind the annular piston 37 need only be released, whereupon the restoring spring 38, constructed accordingly, effects this connection. During operation in forward gear, therefore, the forward-and-reverse clutch unit 9 does not require any compression medium, so that the pumping action performed most of the time that the vehicle is running is reduced. This results in an improvement in the overall efficiency of the transmission and in reduced fuel consumption.

Having thus described a preferred embodiment of my invention, what I claim and desire to secure by U.S. Letters Patent is:

1. A continuously variable power transmission mechanism adapted to delivery driving torque from an internal combustion engine to a driven shaft comprising:
    an input shaft arranged coaxially with respect to said engine;
    a start-up clutch adapted to connect said engine to said input shaft;
    a primary sleeve shaft mounted for rotation about said input shaft;
    a drive pulley connected to said primary sleeve shaft;
    planetary gearing connecting drivably said input shaft and said primary sleeve shaft including a reversing gearset with a sun gear, a ring gear, a planet pinion carrier and compound plane pinions journalled on said carrier, said planet pinions having two engageable sets, the pinions of one set engaging said ring gear and the pinions of the other set engaging said sun gear;
    clutch and brake means for selectively anchoring said ring gear and for connecting said carrier and ring gear together to effect forward drive and reverse drive;
    said start-up clutch comprising an annular piston located within an annular cylinder and defining therewith a pressure chamber, a friction disc having friction surfaces, said friction disc being positioned between an annular friction surface of said start-up clutch and said piston;
    said start-up clutch annular cylinder comprising a pair of radially disposed wall members in abutting side-by-side relationship, and radial grooves formed in one of said wall member to define radial fluid pressure distribution passages extending to said pressure chamber.

2. The combination as set forth in claim 1 wherein said radial fluid pressure distribution passages comprise radial grooves formed in one of said cylinder wall members, the other of said pair of wall member closing said grooves to form radial flow paths.

3. A continuously variable power transmission mechanism adapted to deliver driving torque from an engine to a driven shaft comprising:
    an input shaft arranged coaxially with respect to said engine;
    a start-up clutch adapted to connect said engine to said input shaft;
    a primary sleeve shaft mounted for rotation about said input shaft;
    a drive pulley connected to said primary shaft;
    gearing connecting drivably said input shaft and said primary shaft including a reversing gearset;
    clutch and brake means for controlling said gearing to effect forward drive and reverse drive;
    said start-up clutch comprising a annular piston located within an annular cylinder and defining therewith a pressure chamber, a friction disc having friction surfaces, said friction disc being positioned between an annular friction surface of said start up clutch and said piston;
    said start-up clutch annular cylinder comprising a pair of radially disposed wall members in abutting side-by-side relationship, and radial grooves formed in one of said wall members to define radial fluid pressure distribution passages extending to said pressure chamber.

4. The combination as set forth in claim 3 wherein said radial fluid pressure distribution passages comprise radial grooves formed in one of said cylinder wall members, the other of said pair of wall member closing said grooves to form radial flow paths.

* * * * *